(12) United States Patent
Liu

(10) Patent No.: US 7,903,553 B2
(45) Date of Patent: Mar. 8, 2011

(54) METHOD, APPARATUS, EDGE ROUTER AND SYSTEM FOR PROVIDING QOS GUARANTEE

(75) Inventor: Enhui Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 305 days.

(21) Appl. No.: 10/587,228

(22) PCT Filed: Jul. 21, 2005

(86) PCT No.: PCT/CN2005/001094
§ 371 (c)(1),
(2), (4) Date: Mar. 20, 2007

(87) PCT Pub. No.: WO2006/012789
PCT Pub. Date: Feb. 9, 2006

(65) Prior Publication Data
US 2008/0025218 A1 Jan. 31, 2008

(30) Foreign Application Priority Data
Aug. 5, 2004 (CN) .......................... 2004 1 0070039

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ................ 370/230.1; 370/235; 370/395.31; 455/406; 709/223; 709/232

(58) Field of Classification Search ................ 370/235, 370/254, 389, 332, 237, 238, 395.21, 395.31, 370/395.51, 395.52, 401, 230, 230.1, 236, 355, 395.2, 395.3, 395.53, 469, 471; 455/452.2, 406; 709/223–226, 232, 250
See application file for complete search history.

(56) References Cited

U.S. PATENT DOCUMENTS
6,141,339 A * 10/2000 Kaplan et al. ............ 370/395.61
(Continued)

FOREIGN PATENT DOCUMENTS
CN 1399475 2/2003
(Continued)

OTHER PUBLICATIONS
PCT Written Opinion of the International Searching Authority for PCT/CN2005/001094, Nov. 3, 2005, Applicant: Huawei Technologies Co., Ltd., et al., 3 pages.
(Continued)

Primary Examiner — Aung S Moe
Assistant Examiner — Benjamin Elliot
(74) Attorney, Agent, or Firm — Slater & Matsil, L.L.P.

(57) ABSTRACT

The present invention discloses a method for providing QoS guarantee by an edge router, the edge router transporting user traffic between the access network and core network, the method comprising: creating a service traffic flow classification table; establishing a plurality of label switching paths; configuring the attributes of the label switching paths; classifying and conditioning the service traffic flows entering into the core network at a downlink interface of an edge router according to the service traffic flow classification table; forwarding the processed traffic by an uplink interface of the edge router according to the attributes of the label switching paths. The present invention also discloses an apparatus for providing QoS guarantee by an edge router. Using the present invention, an edge router can provide exact QoS guarantee and QoS routing control for the application flows.

14 Claims, 5 Drawing Sheets

U.S. PATENT DOCUMENTS

| | | | |
|---|---|---|---|
| 6,260,067 B1* | 7/2001 | Barnhouse et al. | 709/224 |
| 6,535,518 B1* | 3/2003 | Hu et al. | 370/401 |
| 6,597,657 B1* | 7/2003 | Tanaka | 370/219 |
| 6,606,311 B1* | 8/2003 | Wang et al. | 370/338 |
| 6,611,522 B1* | 8/2003 | Zheng et al. | 370/395.21 |
| 6,778,498 B2* | 8/2004 | McDysan | 370/231 |
| 6,804,222 B1* | 10/2004 | Lin et al. | 370/338 |
| 6,831,915 B1* | 12/2004 | Beyschlag et al. | 370/352 |
| 6,891,842 B2* | 5/2005 | Sahaya et al. | 370/401 |
| 6,934,249 B1* | 8/2005 | Bertin et al. | 370/218 |
| 7,002,995 B2* | 2/2006 | Chow et al. | 370/485 |
| 7,012,919 B1* | 3/2006 | So et al. | 370/392 |
| 7,042,883 B2* | 5/2006 | Fan et al. | 370/395.4 |
| 7,046,680 B1* | 5/2006 | McDysan et al. | 370/396 |
| 7,065,084 B2* | 6/2006 | Seo | 370/392 |
| 7,184,434 B2* | 2/2007 | Ganti et al. | 370/389 |
| 7,292,580 B2* | 11/2007 | Ramamurthy et al. | 370/395.42 |
| 7,296,288 B1* | 11/2007 | Hill et al. | 726/2 |
| 7,324,447 B1* | 1/2008 | Morford | 370/231 |
| 7,420,962 B2* | 9/2008 | Das et al. | 370/352 |
| 7,496,661 B1* | 2/2009 | Morford et al. | 709/224 |
| 7,586,889 B2* | 9/2009 | Gassho et al. | 370/338 |
| 7,586,899 B1* | 9/2009 | Mohaban et al. | 370/352 |
| 2002/0059411 A1* | 5/2002 | Barnhouse et al. | 709/223 |
| 2003/0033467 A1* | 2/2003 | Yoshizawa et al. | 710/305 |
| 2003/0074443 A1* | 4/2003 | Melaku et al. | 709/224 |
| 2003/0185217 A1 | 10/2003 | Ganti et al. | |
| 2004/0165592 A1* | 8/2004 | Chen et al. | 370/395.1 |
| 2004/0174879 A1* | 9/2004 | Basso et al. | 370/392 |
| 2004/0215817 A1* | 10/2004 | Qing et al. | 709/238 |
| 2004/0223498 A1* | 11/2004 | Sanderson et al. | 370/395.52 |
| 2005/0066053 A1* | 3/2005 | McDysan | 709/243 |
| 2005/0185633 A1* | 8/2005 | Shigei | 370/352 |
| 2008/0025218 A1* | 1/2008 | Liu | 370/235 |

FOREIGN PATENT DOCUMENTS

| | | |
|---|---|---|
| CN | 1523834 | 8/2004 |
| WO | WO 01/77849 | 10/2001 |
| WO | WO 01/77849 A2 | 10/2001 |
| WO | WO 02/062033 | 8/2002 |
| WO | WO 02/076050 | 9/2002 |

OTHER PUBLICATIONS

Communication pursuant to Article 96(2) EPC, EP Patent Application No. 05772426.2-1249, Sep. 20, 2007, Applicant: Huawei Technologies Co., Ltd., 4 pages.

Blake, S., et al., "An Architecture for Differentiated Services," Network Working Group, Dec. 1998, pp. 1-36.

Braden, R., et al., "Resource ReSerVation Protocol (RSVP)—Version 1 Functional Specification," Network Working Group, Sep. 1997, pp. 1-100.

Le Faucheur, F., et al., "Multi-Protocol Label Switching (MPLS): Support of Differentiated Services," Network Working Group, May 2002, pp. 1-38.

* cited by examiner

METHOD, APPARATUS, EDGE ROUTER AND SYSTEM FOR PROVIDING QOS GUARANTEE

FIELD OF THE INVENTION

The present invention relates to the field of network communication, and particularly to a method and an apparatus for providing QoS (Quality of Service) guarantee, as well as an edge router and a system for providing QoS guarantee based on the edge router.

BACKGROUND OF THE INVENTION

With the continuously expanding of the scale of computer networks and the rapidly developing of large internets, routing technology has become gradually a critical technology among the network technologies, and routers have become the most important equipments in a network. A router operates at the third layer of the OSI (Open System Interconnect) Model, which is named the network layer. A router differentiates different networks to implement interconnection and isolation between networks and keep the independence of the individual networks by utilizing the 'logic' network address (i.e., IP address) defined in the network layer.

During the transition of the current telecommunication network from circuit-based technology to packet-based technology and the evolution of multiple independent dedicated service networks toward an integrated multi-service network, IP (Internet Protocol) technology has been widely accepted as the public user network interface of the Next Generation Network service. With the introducing of the MPLS (Multi-protocol Label Switching), an IP network is not only able to keep sufficient flexibility but also able to provide manageable and operable services that may be better than best-effort delivery service, while possessing certain connection oriented characteristic. It is an important feature of the Next Generation Network to provide abundant public operating services by the coexistence and cooperation of the intelligence inside a network and the intelligence at the edge of the network. Accordingly, a multi-service edge router at the edge of a network is very important and necessary for constructing an integrated multi-service network.

TCP/IP (Transmission Control Protocol/Internet Protocol) technology, as originally conceived, offers only a best-effort delivery service without QoS (Quality of Service) guarantee. However, it is difficult for the best-effort delivery service to meet the requirements of multimedia service for delay, jittering and packet loss rate in a multi-service environment, since different services and users have different requirements for quality and security of network service. In view of this, the QoS technologies and mechanisms, such as InterServ (Integrated Service), DiffServ (Differentiated Service) and policy control, have been presented. Nevertheless, the problem of QoS in a packet-based network has not been resolved up to now. The relative QoS mechanism provided by DiffServ can not find a solution to the traffic congestion or optimize the performance of a network, and the quality of network service provided by DiffServ is uncontrollable, immeasurable and not absolutely guaranteed. The absolute QoS mechanism provided by InterServ requires large network overhead, and has a serious problem on extensibility regarding the number of application flows supported and network scale. MPLS traffic engineering technology still can not provide a real-time control system for scheduling of application flow level. Considering the construction of the next generation network by employing IP techniques, the QoS problem has become a critical bottleneck to be broken during network convergence and evolution.

Today's IP networks are all of layered architecture, i.e. all contain a packet-based core network and various types of access networks in order to achieve good manageability, stability and extensibility. The core network routes and switches packets in high speed, having high reliability and redundancy. The access networks support various user access modes, such as Ethernet LAN, xDSL (Digital Subscriber Line), HFC (Hybrid Fiber Coaxial Cable), etc., and provide network service control functions such as access control, authentication billing, network security, VPN (Virtual Private Network) and QoS classification, and the like.

An edge router locates at the egress of an access network and the ingress of a core network, the multi-service supporting capability of which is the most important with respect to whether the network can support various services, and the QoS-supporting capability of which plays an important role in QoS framework of an IP network. A multi-service edge router has to possess capabilities of flow classification, traffic control (including metering, marking, dropping/shaping and queuing) and traffic aggregation.

In the IntServ model, a service traffic flow sender installs and refreshes in advance the information of the resource reservation state at the respective forwarding nodes on the service traffic flow path(s) via Resource Reservation Protocol, thus establishing a virtual connection with QoS guarantee. The respective forwarding nodes recognized and schedules each of the service traffic flows according to the resource reservation soft state (means that a periodic maintaining of the resource reservation refresh packets is needed). To maintain the virtual connection, the service traffic flow sender periodically refreshes the resource reservation soft state to the network via Resource Reservation Protocol until the application layer shows a request to end the reservation or the network feedback can not provide reservation for the application. Resource Reservation Protocol is a path-coupled signaling protocol, and the path of the protocol packet is completely the same as the service traffic flow path.

The functional block diagram of the respective forwarding nodes (including the edge router) in the IntServ model is shown in FIG. 1, the functions include RSVP (Resource Reservation Protocol) protocol processing, RSVP soft state maintaining, routing, policy control, admission control, packet classification, packet forwarding and packet scheduling. To support the IntServ model, the edge router has to possess these functions as well, all of which are directed to application flows including admission control, policy control, RSVP state maintaining, packet classification, queue scheduling. There will be thousands of or even more states, classifications and queues to be maintained if the granularity of control is refined to application flow level.

Although the Intserv model can be used to achieve a refined granularity of resource control in application flow level, it is necessary for the routing equipments (including the edge router) to record a large amount of RSVP soft state information of application flows and to handle a great deal of periodic RSVP soft state refresh packets. Each of the application flows occupies a scheduling queue, thus resulting in a high requirement for the performance of the routing equipments, and a serious issue of extensibility in application to medium/large networks. For this reason, such QoS technology is not used widely in the IP network operated by the telecommunication operator.

Even if IntServ is only applied in access networks and DiffServ or MPLS TE (Multi-protocol Label Switching Edge Router) is used in a core network, the burden of the edge router is not relieved at all. The edge router still has to record a large amount of RSVP soft state information and to handle a great deal of periodic RSVP soft state refresh packets, and to provide the aggregating and mapping functions of QoS classification.

The process of the classification and the conditioning of traffic by an edge router in DiffServ model is shown in FIG. 2: the ingress node at edge of a network performs classification and conditioning, including metering, marking, dropping and shaping, to the packet traffic according to the static SLA (Service Level Agreement). Wherein the marking refers to the process of setting a value for the DSCP (Differentiated Service Code Point) domain in each packet. Each DSCP code represents a class of aggregated traffic (at most 64 classes), and it is required that the same specific QoS forwarding process is performed at all the network nodes. Each hop node inside the network forwards a packet depending on the value of the DSCP domain according to the configured QoS mechanism, such PHB (Per-Hop Behavior) includes resource allocation, queue scheduling, dropping policy, etc.

The DiffServ model employs the concepts of coarse classification and aggregation in which different classes receiving different services in the network, without negotiating in advance on resource reservation. The control is coarser grained, there are generally 6 QoS classes (64 classes at most), each of the classes having several queues. By conditioning the behavior of the boundary node(s), the incoming traffic to each QoS class of the network may be controlled. The states of the flows are not recorded inside the network, but are processed for each packet according to the marked QoS type, thereby the signaling protocol processing is omitted.

FIG. 3 is a functional block diagram of an edge router in the DiffServ model.

The input interface and the output interface both perform classification, metering, processing and queue scheduling, all of which are performed with respect to the level of traffic aggregation, without signaling negotiation and state maintaining of application flow, thereby the number of the queues required are reduced greatly. The specs of flow classification and PHB behavior for each class of service can be configured locally by command lines, or be configured by network management server through provision of SNMP (Simple Network Management Protocol) Interface, or be configured by policy server through provision of COPS (Common Open Policy Service) Interface.

Such DiffServ model of providing classified services is more suitable for a large-scale core network. However, its flow classification spec is rather coarse grained, and is generally based on physical port or logic port instead of application flow. Due to the temporality and frequent variations of the application flow, the identity (the initiation and destination IP addresses, port numbers and protocol types) of the application flow and the desired QoS type are not known by the network management and the policy management, thus an edge router is unable to have the ability of classification and identification in application flow level by configuring the management interfaces. Moreover, because the service of the same class will share the resource of this class, and there will exist a certain degree of resource competition between those services with the same priority, the end-to-end QoS may not be guaranteed.

The operators generally try to avoid the problem of resource competition between services with the same priority according to the statistic characteristic by means of a large bandwidth and a light load, that is to say, the average utilization of the control resources of a core network is no more than 50% or 70%, and the average utilization of resource for the services with higher priorities is no more than 20%. However, the cost of a network with a large bandwidth and a light load is much high, the wider the bandwidth is, the bigger the absolute value of the waste is. Once the load is over 50%, serious traffic congestion problem will occur; furthermore, what the DiffServ provides is only a relative QoS, namely a better QoS than that of the best-effort delivery, which can not provide end-to-end absolute QoS guarantee for the application flow.

SUMMARY

A method for providing quality of service (QoS) guarantee, wherein the method includes the steps of:
  creating a service traffic flow classification table;
  establishing a plurality of label switching paths;
  configuring the attributes of the label switching paths;
  classifying and conditioning the service traffic flows entering a core network at a downlink interface of an edge router according to the service traffic flow classification table;
  forwarding the processed service traffic flows by an uplink interface of the edge router according to the attributes of the label switching paths.

The step of creating a service traffic flow classification table includes the steps of:
  obtaining service traffic flow information, the service traffic flow information includes flow classification spec, priority, QoS class, bandwidth requirement, path information, in which the flow classification spec includes port-level flow classification spec and/or user-level flow classification spec and/or application-flow-level classification spec;
  creating the service traffic flow classification table according to the obtained service traffic flow information.

Particularly, the step of obtaining service traffic flow information is: configuring the service traffic flow information statically.

Particularly, the step of obtaining service traffic flow information is: directly obtaining the service traffic flow information from a service control equipment.

Particularly, the step of obtaining service traffic flow information is: obtaining the service traffic flow information from the service control equipment through a resource control equipment.

Particularly, the step of establishing a plurality of label switching paths is: configuring the label switching paths statically at the uplink interface of the edge router.

Particularly, the step of establishing a plurality of label switching paths is: establishing the label switching paths dynamically via constraint-routing label distribution protocol (CR-LDP) or resource reservation protocol-traffic engineering (RSVP-TE) at the uplink interface of the edge router.

The step of establishing a plurality of label switching paths further includes the step of:
  constructing an edge-to-edge label switching path concatenated pipe or a virtual multi-protocol label switching network on the core network by using the label switching paths.

Particularly, the step of configuring the attributes of the label switching paths is:
  configuring traffic class, priority, QoS class, bandwidth attribute of the label switching paths by network capacity planning and traffic engineering statistics.

The service traffic flow classification table comprises:
  service traffic flow identification, priority, QoS class, bandwidth requirement, and outgoing aggregation path information.

The step of classifying and conditioning the service traffic flows entering a core network at a downlink interface of an edge router according to the service traffic flow classification table comprises the steps of:

obtaining the service traffic flow identification;

looking up the service traffic flow classification table according to the service traffic flow identification;

classifying and conditioning the service traffic flow entering into the core network according to the corresponding service traffic flow information in the service traffic flow classification table.

The step of classifying and conditioning the service traffic flow entering into the core network according to the corresponding service traffic flow information in the service traffic flow classification table includes the steps of:

classifying and marking the service traffic flow according to the corresponding priority and QoS class;

shaping and policing the service traffic flow according to the corresponding bandwidth requirement;

selecting the forwarding mode and path of the service traffic flow according to the corresponding outgoing aggregation path information.

The forwarding mode of the service traffic flow includes:

best-effort delivery in accordance with network protocols;

delivery through the corresponding label switching paths of this class of traffic.

The step of forwarding the processed service traffic flows by an uplink interface of the edge router according to the attributes of the label switching paths includes:

steering the service traffic flow to the egress router of the core network via network protocols when the best-effort delivery in accordance with network protocols is selected as the forwarding mode of the service traffic flow;

steering the service traffic flow to the egress router of the core network through the label switching path concatenated pipe or the virtual multi-protocol label switching network when the delivery through the corresponding label switching path of this class of traffic is selected as the forwarding mode of the service traffic flow.

The method further includes the step of:

modifying the service traffic flow classification table when the service traffic flow is changed.

The step of modifying the service traffic flow classification table when the service traffic flow is changed includes:

obtaining and adding the service traffic flows information of a service session into the service traffic flow classification table when the session is established;

canceling the service traffic flow information of the session from the service traffic flow classification table when the session is ended.

Preferably, the core network is an IP network.

The present invention further provides an apparatus for providing QoS guarantee, wherein the apparatus includes:

a service traffic flow information obtaining means, for creating a service traffic flow classification table;

a label switching path establishing means, for establishing a plurality of label switching paths;

a label switching path configuring means, for configuring the attributes of the label switching paths;

a first performing means, for classifying and conditioning service traffic flows entering into a core network according to the service traffic flow classification table; and a second performing means, for forwarding the processed service traffic flow according to the attributes of the label switching paths.

The present invention further provides an edge router based on the above mentioned means for providing QoS guarantee, which includes a configuration management interface, wherein the edge router further includes:

a service traffic flow information obtaining means, for creating a service traffic flow classification table;

a label switching path establishing means, for establishing a plurality of label switching paths;

a label switching path configuring means, for configuring the attributes of the label switching paths;

a first performing means, for classifying and conditioning the service traffic flows entering the core network according to the service traffic flow classification table; and, a second performing means, for forwarding the processed service traffic flow according to the attributes of the label switching paths.

The present invention further provides a system based on the above mentioned edge router for providing QoS guarantee, which includes a service control equipment, a resource control equipment, and an edge router, wherein the edge router includes:

a service traffic flow information obtaining means, for creating a service traffic flow classification table;

a label switching path establishing means, for establishing a plurality of label switching paths;

a label switching path configuring means, for configuring the attributes of the label switching paths;

a first performing means, for classifying and conditioning the service traffic flows entering into the core network according to the service traffic flow classification table; and a second performing means, for forwarding the processed service traffic flows according to the attributes of the label switching paths.

It can be seen from the above technical solutions provided by the present invention that a edge-to-edge LSP concatenated pipe or a virtual MPLS network may be formed on the core network by establishing a plurality of LSP (Label Switching Path) at the uplink interface of the edge router in the present invention. This makes it possible to select to steer service traffic flows to the Internet egress router by way of IP or steer service traffic flows to the Internet egress router through LSP concatenated pipe or virtual MPLS network according to the traffic class. Thus, precise QoS guarantee and QoS routing control can be provided for application flows between the edges of the core network, thereby meeting the requirements for a packet based network to support various telecommunication services simultaneously. Moreover, since the QoS control in application flow level is performed only at the edges, while the traffic control in LSP level is performed at the core of the network, high-speed forwarding capability and simplicity in the core of the network are ensured.

DETAILED DESCRIPTION OF THE EMBODIMENTS

Figure 1:
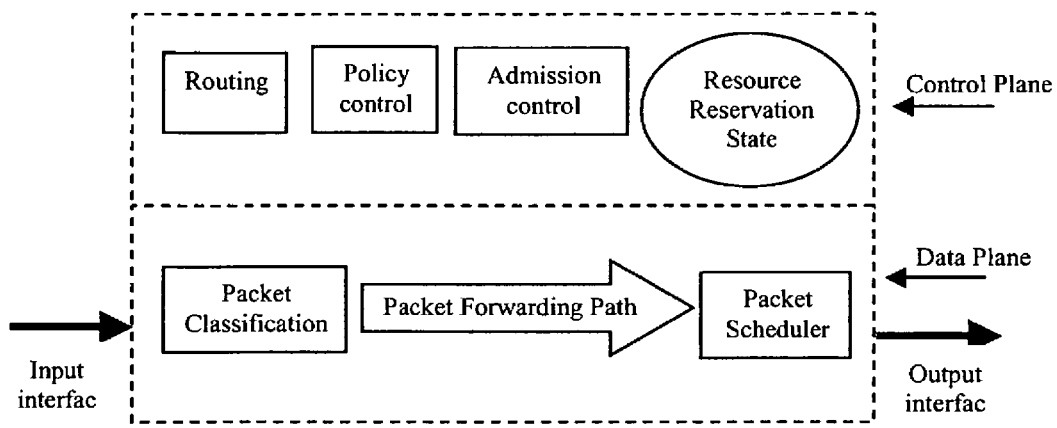
FIG. 1 is a functional block diagram of a forwarding node in the IntServ model.
Figure 2:
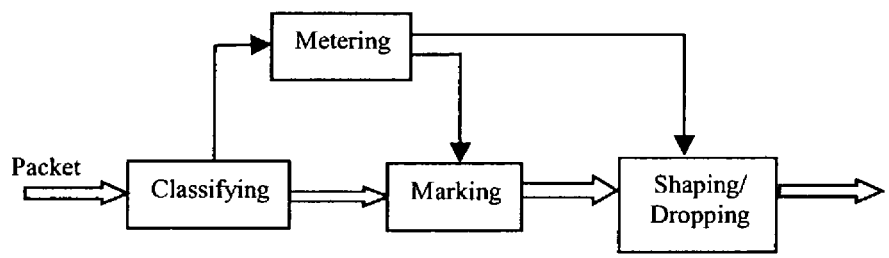
FIG. 2 is a block diagram of processing of traffic classification and the conditioning by an edge router in the DiffServ model.
Figure 3:
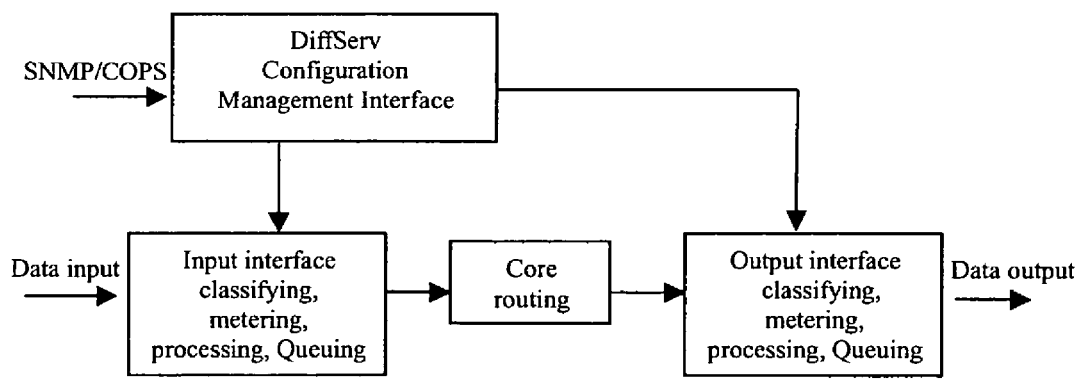
FIG. 3 is a functional block diagram of an edge router in the DiffServ model.

The present invention aims to form an edge-to-edge LSP concatenated pipe or a virtual MPLS (Multi-Protocol Label Switching) network on a core network by establishing a plurality of LSPs (Label Switching Path) at the uplink interface of an edge router. Thus, when a service session is established, the service traffic flow information of the service session is obtained and recorded by the edge router. When packets are processed by a downlink input interface, the downlink input interface selects the mode for sending the service traffic flow according to the recorded service traffic flow information, labels the service traffic flow with MPLS multi-layer label stack, and sends it to the LSP concatenated pipe or the virtual MPLS network for this class of service traffic at the uplink output interface. The uplink output interface performs classification and conditioning for the LSP traffic according to the LSP attributes when sending the packets, thus providing QoS guarantee in application flow level for the service traffic flow.

It is known to the skilled in the art that a router connects the nodes of a network, and the packet forwarding process of the router according to the TCP/IP protocols is as follows:

(1) an interface receives a packet. In this step the processing for the network physical layer is performed, that is, the coded and modulated data signal is restored into data. Different physical network mediums determine different network interfaces. For a router, for example, there is a 10 Base-T (10 Mbps base-band transmission over twisted pairs) Ethernet interface corresponding with the 10 Base-T Ethernet, an SDH (Synchronous Digital Hierarchy) interface corresponding with the SDH, and a V.35 interface corresponding with the DDN (Digital Data Network).

(2) Depending on the network physical interfaces, the router invokes the corresponding functional module in the link layer (the second layer of the seven-layer network protocol) to interpret and process the link layer protocol header in this packet. The process in this step is relatively simple, and is mainly for data integrity verification, such as CRC (Cyclic Redundancy Coding) check, frame-length check.

(3) After the integrity verification for a data frame is completed in the link layer, the router begins to deal with the IP layer of this data frame. This process is the kernel of the functions of a router. According to the destination IP address in the IP header of the data frame, the router queries the routing table for the IP address of the next hop, the TTL (Time to Live) field in the header of the IP packet begins to decrement, and a new checksum is calculated. If the type of the network interface for receiving data frames is different from that of the network interface for forwarding data frames, the IP packet may be sectioned or regrouped because of the specification on the maximum frame length.

(4) According to the IP address of the next hop found from the routing table, the IP packet is sent to the corresponding outgoing link layer, encapsulated with a corresponding link layer header, and sent out through an output network physical interface.

Figure 4:
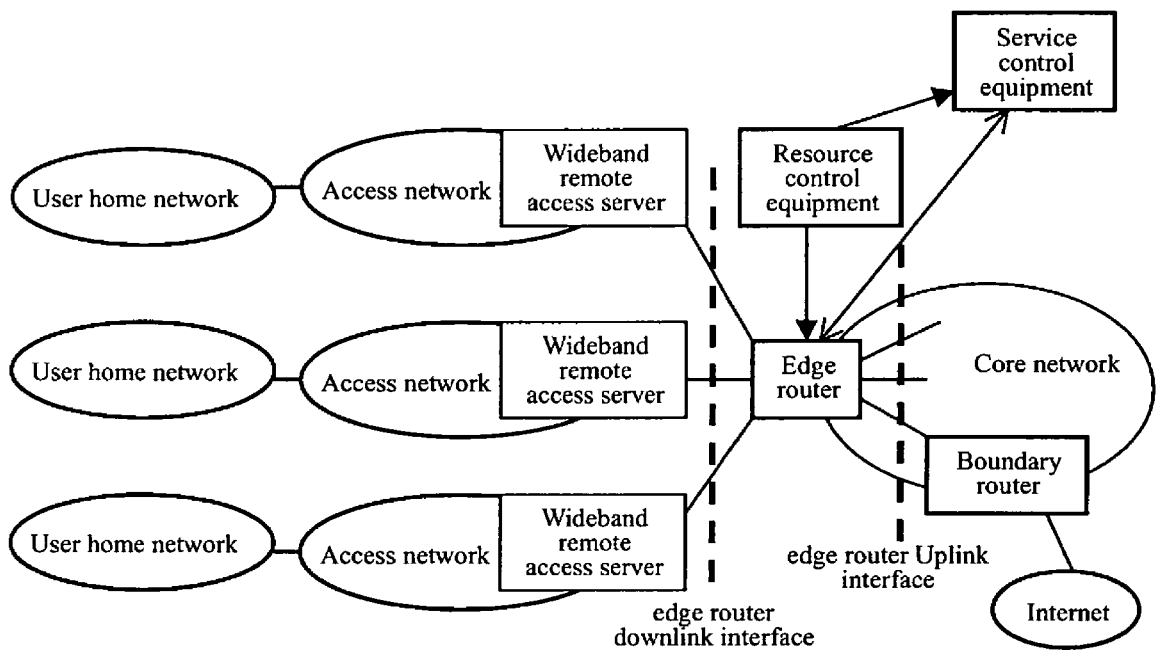
FIG. 4 is a diagram of networking of an edge router connecting access networks and a core network.

The edge router locates at the boundary between the access network and the core network, a networking structure of which being shown in FIG. 4. Different users log respectively onto different wideband remote access servers through the local network then connect to the core network via the edge router, and connect user traffic to the Internet egress router via the core network. The edge router often aggregates a large amount of communication traffic and transmits packets between networks. An edge router has to have a plurality of interfaces having different speeds and adapted for different types of communication traffic to support, for example, Ethernet, ATM (Asynchronous Transfer Mode) and SONET (Synchronous Optical Network). The edge router provides growing technical supports for many services, such as multi-protocol label switching, QoS (Quality of Service) performing, voice transferring over packet, IP multicasting and wireless network. It is necessary for the edge router to meet various requirements of users, ranging from simple networking to complex multimedia services and VPN services etc., which requires the edge router to have strong realization capability on both hardware and software. The present invention is to enable the edge router to provide QoS guarantee in application flow level in multi-service packet-based network on the basis that the edge router supports DiffServ (Differentiated Service) and MPLS techniques.

The present invention will be described in further details in conjunction with the appended drawings and the embodiments.

Figure 5:
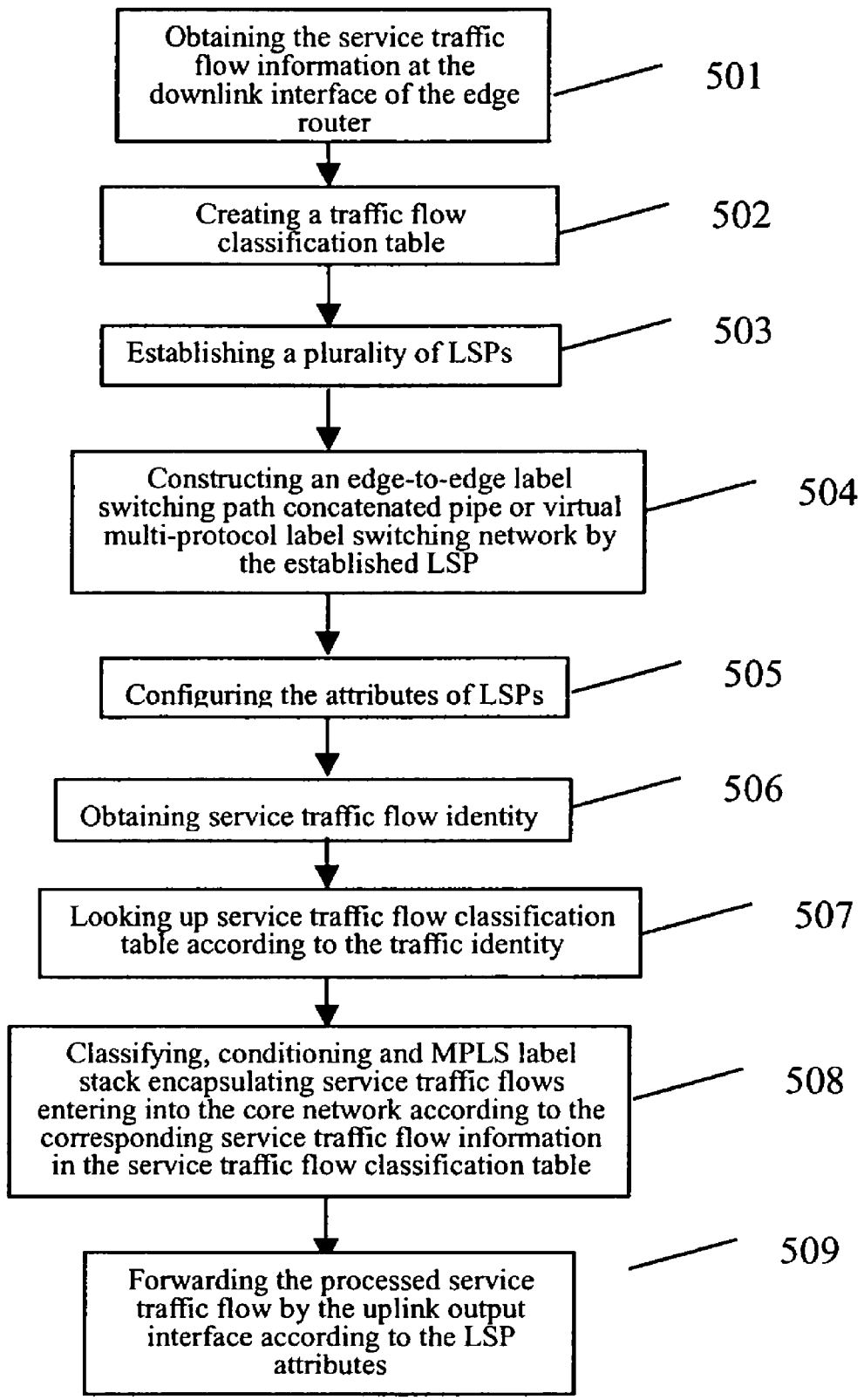
FIG. 5 is a flow diagram of a method according to an embodiment of the present invention.

Referring to FIG. 5, in which a flow chart of the method according to an embodiment of the present invention is shown, which includes the following steps:

Step 501: obtaining service traffic flow information at the downlink interface of the edge router (i.e. the interface connecting with an access network node). The service traffic flow information includes flow classification spec, priority, QoS class, bandwidth requirement, and path information etc. The flow classification spec includes port-level traffic classification spec and/or user-level traffic classification spec and/or application flow-level traffic classification spec.

The service traffic flow information can be configured during the initialization of a service session, or can be obtained from service control equipment.

The service control equipment is able to have the knowledge of the starting and terminating time of the traffic exactly, as well as parameters such as the identity, the application type and the QoS requirement of the traffic, so the edge router may have the ability of classification and identification in application flow level by providing a QoS control interface to receive the information. The QoS requirement of the service traffic flow can be exchanged directly between the service control equipment and the edge router through this QoS control interface. Also, the QoS requirement of the service traffic flow can be forwarded by the service control equipment through a resource control equipment. The resource control equipment performs exchanging with the edge router directly through this QoS control interface. Thus, as a service session is initialized, the edge router receives the identification (a quintuple or a triplet), the priority, the QoS class, the path (MPLS multi-layer label stack) and the bandwidth requirement of service traffic flows of the session from the service control equipment or the resource control equipment through the QoS control interface.

Step 502: establishing a service traffic flow classification table according to the obtained service traffic flow information. The edge router creates an entry in the service traffic flow classification table to recode the received service traffic flow information.

The service traffic flow classification table includes the following information: service traffic flow identification, priority, QoS class, bandwidth requirement, outgoing aggregation path information.

Step 503: establishing a plurality of LSPs. The LSPs can be established at the uplink interface of the edge router by means of static configuration, or can be established dynamically through CR-LDP (Constraint-Routing Label Distribution Protocol) or RSVP-TE (Resource Reservation Protocol-Traffic Engineering) signaling.

CR-LDP is an LDP (Label Distribution Protocol) signaling based on MPLS (Multi-Protocol Label Switching) standard, which can be used in establishing and maintaining the LSPs capable of guaranteeing the IP CoS (IP Class of Service) services. CR-LDP utilizes UDP (User Datagram Protocol) to find MPLS peer-to-peer network entity, and uses TCP (Transmission Control Protocol) session to distribute label request. CR-LDP dose not demand the LSR (Label Switching Router) to update the state of each LSP, because it utilizes TCP to transmit control message, and to provide reliable message transfer, without additional bandwidth consumption. To maintain the connection between the neighboring nodes, CR-LDP has the function of checking the existence of the neighboring nodes and monitoring the TCP connection. CR-LDP contains five types of messages, which are Discovery, Session, Advertise, Notification, and Control respectively, each of the messages employing TLV (Type-Length-Value) to encode the common structure.

RSVP is a signaling protocol, which is used by the host to establish and control the resource reservation tunnels for its service traffic flows in the IP network. MPLS traffic engineering also needs to reserve resource in the IP network, this is similar with the resource reservation of the RSVP, so that RSVP can be extended as RSVP-TE, and used in traffic engineering. RSVP-TE has many additional objects supporting the establishment and management of the explicitly routed LSP on the basis of the conventional RSVP protocol, and is responsible for distributing the label information of the MPLS LSP. RSVP-TE occurs between the ingress and the egress routers of the traffic trunk, employs traffic parameters of IntServ (Integrated Service) to describe the QoS parameters thereof, and utilizes PATH message and RSEV message to establish an LSP tunnel.

Step 504: constructing an edge-to-edge label switching path concatenated pipe or a virtual multi-protocol label switching network on the core network by the established LSP.

Step 505: Configuring the attribute(s) of the LSP.

The attributes of LSP, such as traffic classes, priority, QoS class, bandwidth etc., are configured by network capacity planning (for example, the traffic peak value of a certain traffic such as voice traffic every day, the required QoS class and bandwidth of these traffic etc.) and traffic engineering statistics (for example, the distribution of the traffic load over the network, the distribution of congestion and bottle-neck nodes, the proportion of the bandwidth that could be occupied by the traffics of various QoS classes to guarantee the network performance), so as to bear different classes of service traffic. The traffic classes can be classified according to the QoS class or the application types such as VoIP (Voice over IP)/VoD (Video on Demand)/WEB (World Wide Web) etc., and is substantially a number of traffic aggregation classes.

Step 506: obtaining the service traffic flow identification of a service session;

Step 507: looking up the service traffic flow classification table according to the service traffic flow identification.

Step 508: performing classification, conditioning and MPLS label stack encapsulation to the service traffic flows entering into the core network according to the corresponding service traffic flow information in the service traffic flow classification table.

The label switching path mentioned in the above steps may be MPLS LSP technique, and can also be substituted by any other techniques that have traffic aggregation function, such as L1VPN (Layer 1 VPN, VPN: Virtual Private Network), L2VPN (Layer 2 VPN), L3VPN (Layer 3 VPN), Tunnel, VLAN (Virtual Local Area Network) etc., namely, it is not limited to MPLS LSP techniques.

The flow classification specs can be in port level, which will be recognized by physical port number or logic port number; or can be in user level, which will be recognized by IP address, MAC (Medium Access Control layer) address and VLAN ID (Virtual Local Area Network Identity); or further, can be in application flow level, which will be recognized by IP quintuple (source IP address, destination IP address, source port, destination port and protocol type) or triplet (destination IP address, destination port and protocol type).

The classified traffic is conditioned according to the DiffServ standard (IETF-rfc2475) of IETF. The conditioning includes the following steps of:

Classifying and marking the service traffic flow according to the corresponding priority and the requirement on QoS class;

Shaping and policing the service traffic flow according to the requirement on the bandwidth;

Selecting the forwarding mode of the service traffic flow according to the corresponding path information: forwarding in the best-effort delivery mode of IP or stamping with a MPLS multi-layer label stack, sending into the LSP pipe or the virtual MPLS network of this class of traffic at the uplink output interface.

Then, it proceeds to step 509: forwarding the processed service traffic flow by the uplink output interface of the edge router according to the attribute(s) of the LSP.

The service traffic flow will be connected to the egress router in the Internet via IP protocols if the selected forwarding mode is the best-effort delivery according to IP protocols;

The service traffic flow will be connected to the egress router in the Internet through LSP pipe or virtual MPLS network if the selected forwarding mode is corresponding LSP delivery of this class of traffic.

The uplink output interface of the edge router performs classifying and shaping of the LSP traffic according to the LSP attribute(s) when it sends packets, wherein the classifying and shaping include measuring, marking, dropping and policing of the MPLS packets.

The network core node pops out and forwards the labels according to the MPLS multi-layer label stack and the priority of the MPLS packets that the edge router marked in the packet header, and measures, drops, shapes and monitors the LSP traffic according to the LSP attribute(s).

It is necessary to condition the service traffic flow classification table according to the change of the service traffic flow when the service traffic flow of a service session changes. At the QoS control interface, the service control equipment or resource control equipment will notify the edge router to cancel the service traffic flow information prior to the change and set the service traffic flow information following the change. That is to say, the service traffic flow information of a service session is obtained and added into the service traffic flow classification table when the session is established; and the service traffic flow information of the session is cancelled from the service traffic flow classification table at the end of the session.

Figure 6:
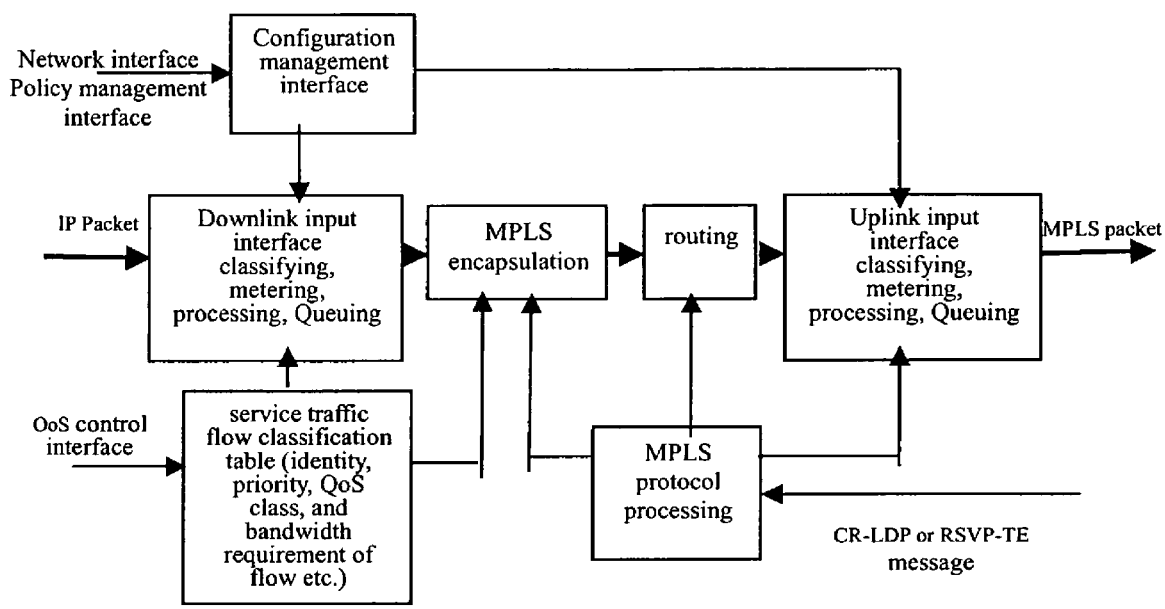
FIG. 6 is an internal functional block diagram of an edge router according to an embodiment of the present invention.

The internal functions of the edge router according to the present invention are illustrated in FIG. 6, in which:

(1) When a service session is initialized, the edge router will receive from the service control equipment or the bearer control equipment the traffic identity (quintuple or triplet), priority, QoS class, path (MPLS multi-layer label stack) and bandwidth requirement of the session at the QoS control interface. The edge router then creates an entry in the flow classification table for the flow to record the information.

(2) When the service traffic flow of the session is changed, at the QoS control interface, the service control equipment or the bearer control equipment will notify the edge router to cancel the service traffic flow information prior to the change and set the service traffic flow information following the change.

(3) When the session is completed, the service control equipment or the bearer control equipment will notify the edge router to cancel the service traffic flow information of the session.

(4) When dealing with packets at the downlink input interface, the edge router queries the service traffic flow classification table, recognizes the traffic according to the identity thereof, performs the classifying and marking according to the priority and the requirement on QoS class of the flow, performs the shaping and monitoring according to the requirement on bandwidth of the flow, chooses to forward in the best-effort delivery mode of IP or label with MPLS multi-layer label stack according to the path information of the flow, and sends the packets into the LSP pipe or the virtual MPLS network of this class of traffic at the uplink output interface. The uplink output interface perform classification and conditioning (including measuring, marking, dropping, shaping and monitoring of the MPLS packets) of the LSP traffic according to the LSP attribute(s), when it sends the packets.

(5) The network core node pops out and forwards the labels according to the MPLS multi-layer label stack and priority of MPLS packets that the edge router marked in the packet header, and measures, drops, shapes and monitors the LSP traffic according to the LSP attribute(s).

Figure 7:
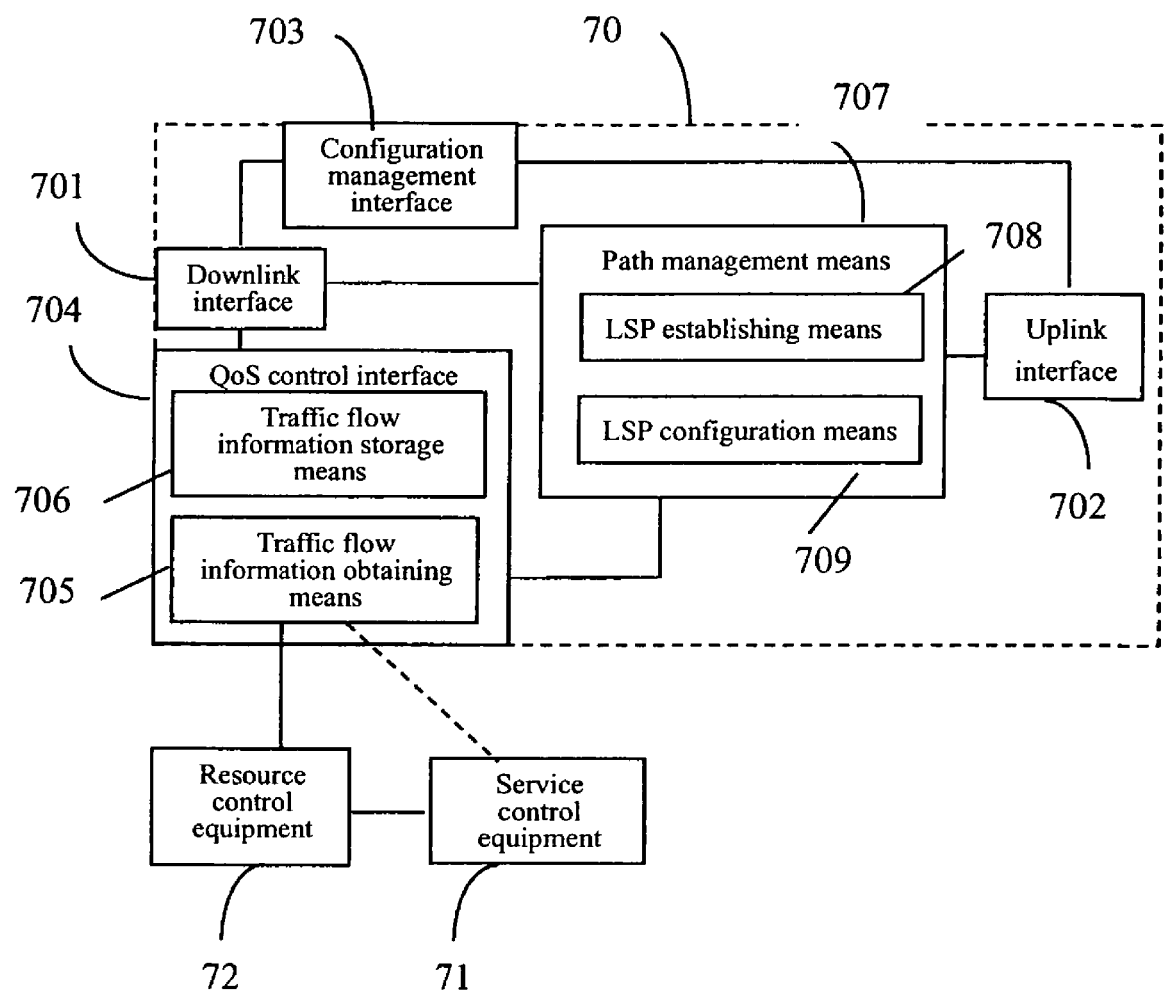
FIG. 7 is a block diagram of the architecture of a system according to an embodiment of the present invention.

FIG. 7 shows the block diagram illustrating the structure of the system according to an embodiment of the present invention, in which:

The present invention provides an apparatus for providing QoS guarantee, which includes: a service traffic flow information obtaining means, for creating a service traffic flow classification table; a label switching path establishing means, for establishing a plurality of label switching paths; a label switching path configuring means, for configuring the attributes of the label switching paths; and a first performing means, for performing the classification and conditioning of the service traffic flows entering into the core network according to the service traffic flow classification table; a second performing means, for forwarding the processed service traffic flow according to the attributes of the label switching paths.

The means described above may refer to the downlink interface 701, the uplink interface 702, the QoS control interface 704 and the path management means 707 in FIG. 7. Particularly, said service traffic flow information obtaining means corresponds to the service information obtaining means 707 in FIG. 7, said label switching path establishing means corresponds to the label switching path establishing means 708 in FIG. 7, said label switching path configuring means corresponds to the label switching path configuring means 709 in FIG. 7, said first performing means corresponds to the downlink interface 701 in FIG. 7, and said second performing means corresponds to the uplink interface 702 in FIG. 7.

In addition, in FIG. 7, the QoS control interface 704 further includes a service traffic flow information storage means 706, which is used to store the service traffic flow classification table created by the service traffic flow information obtaining means 705.

As shown in FIG. 7, in addition to the specific sub-means mentioned above, the edge router 70 based on the means for providing QoS guarantee according to the present invention also includes a configuration management interface 703.

The system for providing QoS guarantee based on the above edge router as described in FIG. 7 includes: service control equipment 71, resource control equipment 72, and edge router 70.

In which the edge router 70 includes:
a downlink interface 701 for receiving the IP service traffic flows; a uplink interface 702 for forwarding the IP service traffic flows received by the downlink interface; a configuration management interface 703 coupled to the downlink interface and the uplink interface respectively, for configuring the parameters of the edge router; a QoS control interface 704 coupled to the downlink interface, for obtaining and storing the service traffic flow classification information, the QoS control interface 704 includes: a service traffic flow information obtaining means 705 for obtaining the service traffic flow information and a service traffic flow information storage means 706 for storing the obtained service traffic flow information; a path management means 707 for managing the transmission path of the service traffic flow, the path management means 707 including: a label switching path establishing means 708 for establishing the label switching path for transmitting the service traffic flow, and a label switching path configuration means 709 for configuring the attribute(s) of the label switching path.

Firstly, a number of LSPs are configured statically by the label switching path configuration means in the path management means, or established dynamically by the label switching path establishing means via CR-LDP or RSVP-TE signaling, thus constructing an edge-to-edge LSP concatenated pipe or MPLS virtual network on the core network.

Thus, when a service session is initialized, the service traffic flow information obtaining means obtains the traffic identity (quintuple or triplet), priority, QoS class, path (MPLS multi-layer label stack) and bandwidth requirement of the session at the QoS control interface from the service control equipment or through the resource control equipment, and then stores the information into the service traffic flow information storage means.

The edge router receives and handles packets at the downlink interface, lookups for the service traffic flow information stored in the service traffic flow information storage means, recognizes the service traffic flow according to the traffic identity, performs classifying and marking according to the priority and the QoS class requirement of the flow, performs shaping and monitoring according to the bandwidth requirement of the flow, and selects to forward the packets in the best-effort delivery mode of IP or to stamp the packets with MPLS multi-layer label stack, and sends the packets to the LSP pipe or the virtual MPLS network of this class of traffic at the uplink output interface. The uplink output interface perform classification and conditioning (including measuring, marking, dropping, shaping and monitoring of the MPLS packets) of the LSP traffic according to the LSP attribute(s), when it sends the packets.

When the service traffic flow of the session is changed, at the QoS control interface, the service control equipment or the resource control equipment will notify the edge router to cancel the service traffic flow information prior to the change and set the service traffic flow information following the change.

The network core node pops out and forwards the labels according to the MPLS multi-layer label stack and priority of MPLS packets marked in the packets header by the edge router, and measures, drops, shapes and monitors the LSP traffic according to the LSP attribute(s).

Therefore, the system provides an exact QoS guarantee and a QoS routing control for the applications between the edges of the core network through the embodiments of the present invention, so as to meet the requirement for a packet-based network to support various services.

Although the present invention has been described with reference to certain embodiments, it is obvious to the skilled in the art that many variations and changes in the present invention may be made without departing from the spirit of the present invention, and it is intended that the appended claims cover theses variations and changes without departing from the spirit of the present invention.

The invention claimed is:

1. A method for providing quality of service (QoS) guarantee, wherein the method comprises the steps of:
   creating, at an edge router, a table of service traffic flow classification;
   establishing, at an uplink interface of the edge router, a plurality of label switching paths, and constructing an edge-to-edge label switching path concatenated pipe by the established label switching paths;
   configuring attributes of the label switching paths;
   obtaining, at the edge router, service traffic flow information of a service traffic flow from a service control equipment, the service traffic flow information comprising at least one of flow classification spec, priority, QoS class, bandwidth requirement, and path information of the service traffic flow, and the service control equipment notifying the changes of the service traffic flow to the edge router in one or more of the following occasions: when a service session is initialized, when the service traffic flow of the service session changes, or when the service session ends;
   updating dynamically, at the edge router, table entries of the table of service traffic flow classification according to the obtained service traffic flow information;
   classifying and conditioning the service traffic flows entering into a core network at a downlink interface of the edge router according to the table of service traffic flow classification; and
   forwarding the processed service traffic flows by the uplink interface of the edge router according to the attributes of the label switching paths, wherein forwarding the processed service traffic flows comprises steering the processed service traffic flows to an egress router of the core network through the edge-to-edge label switching path concatenated pipe;
   wherein the step of classifying and conditioning the service traffic flows entering into a core network at a downlink interface of an edge router according to the table of service traffic flow classification comprises the steps of
      (a) obtaining, at the edge router, a service traffic flow identification of the service traffic flow entering into the core network;
      (b) looking up the table of service traffic flow classification according to the service traffic flow identification;
      (c) classifying and marking the service traffic flows according to the corresponding priority and QoS class;
      (d) shaping and policing the service traffic flows according to the corresponding bandwidth requirement; and
      (e) selecting the forwarding mode and path of the service traffic flows according to the corresponding outgoing aggregation path information.

2. The method according to claim 1, wherein the step of obtaining service traffic flow information is directly obtaining the service traffic flow information from the service control equipment.

3. The method according to claim 1, wherein the step of obtaining service traffic flow information is obtaining the service traffic flow information from the service control equipment through a resource control equipment, the resource control equipment distributing route and resource according to QoS requirements of the service traffic flow.

4. The method according to claim 1, wherein the step of establishing a plurality of label switching paths is configuring the label switching paths statically at the uplink interface of the edge router.

5. The method according to claim 1, wherein the step of establishing a plurality of label switching paths is establishing the label switching paths dynamically via constraint-routing label distribution protocol (CR-LDP) or resource reservation protocol-traffic engineering (RSVP-TE) at the uplink interfaces of the edge router.

6. The method according to claim 1, wherein the step of establishing a plurality of label switching paths further comprises the step of:
   constructing an edge-to-edge label switching path concatenated pipe or a virtual multi-protocol label switching network on the core network by using the label switching paths.

7. The method according to claim 1, wherein the step of configuring the attributes of the label switching paths is:
   configuring traffic class, priority, QoS class, bandwidth attribute of the label switching paths by network capacity planning and traffic engineering statistics.

8. The method according to claim 1, wherein the method further comprises the step of:
   modifying the table of service traffic flow classification according to change of the service traffic flow when the service traffic flow is changed.

9. The method according to claim 8, wherein the step of modifying the table of service traffic flow classification when the service traffic flow is changed comprises:
   obtaining and adding the service traffic flow information of a service session into the table of service traffic flow classification when the session is established;
   canceling the service traffic flow information of the service session from the table of service traffic flow classification when the service session is ended.

10. The method according to claim 1, wherein the core network is an IP network.

11. An apparatus for providing quality of service (QoS) guarantee, wherein the apparatus comprises:
   a service traffic flow information obtaining means, for creating a table of service traffic flow classification, obtaining service traffic flow information of a service traffic flow from a service control equipment notifying of changes of the service traffic flow in at least one of the following occasions: when a service session is initialized, when a service traffic flow of the service session changes, or when the service session ends, and updating dynamically table entries of the table of service traffic flow classification according to the obtained service traffic flow information, wherein the service traffic flow information comprises at least one of flow classification spec, priority, QoS class, bandwidth requirement, and path information of the service traffic flow;
   a label switching path establishing means, for establishing a plurality of label switching paths and constructing an edge-to-edge label switching path concatenated pipe by the established label switching paths;

a label switching path configuring means, for configuring the attributes of the label switching paths;

a downlink interface configured to obtain a service traffic flow identification of the service traffic flow entering into the core network, look up the table of service traffic flow classification according to the service traffic flow identification, classify and mark the service traffic flows according to the corresponding priority and QoS class, shape and police the service traffic flows according to the corresponding bandwidth requirement, and select the forwarding mode and path of the service traffic flows according to corresponding outgoing aggregation path information; and an uplink interface configured to steer the service traffic flows to an egress router of the core network through the edge-to-edge label switching path concatenated pipe.

12. An edge router for providing quality of service (QoS) guarantee, comprises a configuration management interface, wherein the edge router further comprises:

a service traffic flow information obtaining means, for creating a table of service traffic flow classification, and obtaining service traffic flow information of a service traffic flow from a service control equipment notifying of changes of the service traffic flow in at least one of the following occasions: when a service session is initialized, when the service traffic flow of the service session changes, or when the service session ends, and updating dynamically table entries of the table of service traffic flow classification according to the obtained service traffic flow information, wherein the service traffic flow information comprises flow classification spec, priority, QoS class, bandwidth requirement, and path information of the service traffic flow of the service traffic flow;

a label switching path establishing means, for establishing a plurality of label switching paths and constructing an edge-to-edge label switch path concatenated pipe by the established label switching paths;

a label switching path configuring means, for configuring the attributes of the label switching paths;

a downlink interface configured to configure a service traffic flow identification of the service traffic flow entering into the core network, look up the table of service traffic flow classification according to the service traffic flow identification, classify and mark the service traffic flows according to the corresponding priority and QoS class, shape and police the service traffic flows according to the corresponding bandwidth requirement, and select the forwarding mode and path of the service traffic flows according to corresponding outgoing aggregation path information; and an uplink interface configured to steer the service traffic flows to an egress router of the core network through the edge-to-edge label switch path concatenated pipe.

13. The edge router according to claim 12, wherein the service traffic flow information of a service traffic flow is obtained directly from the service control equipment or from the service control equipment through a resource control equipment, the resource control equipment distributing route and resource according to QoS requirements of the service traffic flow.

14. A system for providing quality of service (QoS) guarantee, comprises a service control equipment, a resource control equipment, and an edge router, wherein the edge router comprises:

a service traffic flow information obtaining means, for creating a table of service traffic flow classification, obtaining service traffic flow information of a service traffic flow from a service control equipment notifying of changes of the service traffic flow, and updating dynamically table entries of the table of service traffic flow classification according to the obtained service traffic flow information, wherein the service traffic flow information comprises flow classification spec, priority, QoS class, bandwidth requirement, and path information of the service traffic flow of the service traffic flow;

a label switching path establishing means, for establishing a plurality of label switching paths and constructing an edge-to-edge label switching path concatenated pipe by the established label switching paths;

a label switching path configuring means, for configuring the attributes of the label switching paths;

a downlink interface configured to obtain a service traffic flow identification of the service traffic flow entering into the core network, look up the table of service traffic flow classification according to the service traffic flow identification, classify and mark the service traffic flows according to the corresponding priority and QoS class, shape and police the service traffic flows according to the corresponding bandwidth requirement, and select the forwarding mode and path of the service traffic flows according to the corresponding outgoing aggregation path information; and an uplink interface configured to steer the service traffic flows to an egress router of the core network through the edge-to-edge label switching path concatenated pipe.

* * * * *